US005944376A

United States Patent [19]

Buchanan, Jr.

[11] Patent Number: 5,944,376

[45] Date of Patent: Aug. 31, 1999

[54] METHOD AND APPARATUS FOR LOAD COMPENSATING DOORS AND HATCHES

[75] Inventor: Harry C. Buchanan, Jr., Spring Valley, Ohio

[73] Assignee: Valeo, Inc., Auburn Hills, Mich.

[21] Appl. No.: 08/873,062

[22] Filed: Jun. 11, 1997

[51] Int. Cl.[6] .................................................. B60J 5/00

[52] U.S. Cl. .................................. 296/146.4; 296/100.1; 49/334

[58] Field of Search .............................. 296/146.1, 146.4, 296/100.1; 49/337, 333, 334, 335, 338

[56] References Cited

U.S. PATENT DOCUMENTS

| | | | |
|---|---|---|---|
| 2,387,800 | 10/1945 | Leland et al. | 49/334 X |
| 3,488,086 | 1/1970 | Himka et al. | 296/146.4 X |
| 5,448,856 | 9/1995 | Moore et al. | 49/340 |
| 5,468,042 | 11/1995 | Heinrichs et al. | 296/146.4 |
| 5,531,498 | 7/1996 | Kowall | 296/146.4 |
| 5,532,521 | 7/1996 | Leininger | 296/146.4 X |
| 5,563,483 | 10/1996 | Kowall et al. | 318/283 |
| 5,687,507 | 11/1997 | Beran | 49/339 X |

*Primary Examiner*—D. Glenn Dayoan
*Assistant Examiner*—Jason Morrow
*Attorney, Agent, or Firm*—J. Gordon Lewis

[57] ABSTRACT

An apparatus is disclosed for moving a vehicle door relative to a vehicle frame. The apparatus includes a motor for rotating a shaft. The apparatus further includes a first threaded member coupled to the shaft of the motor, wherein the first threaded member is mechanically linked to the vehicle frame. In addition, the apparatus includes a second threaded member which cooperates with the first threaded member so that the second threaded member is moved relative to the first threaded member when the first threaded member is rotated by the shaft of the motor, wherein the second threaded member is mechanically linked to the vehicle door. A method for moving a vehicle door relative to a vehicle frame is also disclosed.

25 Claims, 6 Drawing Sheets

FIG-1
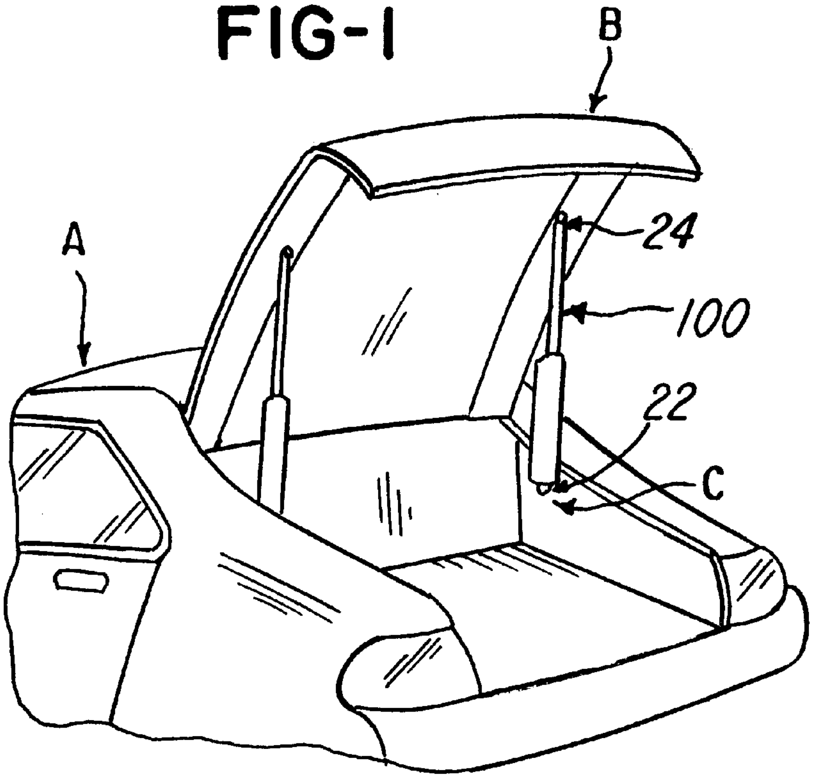
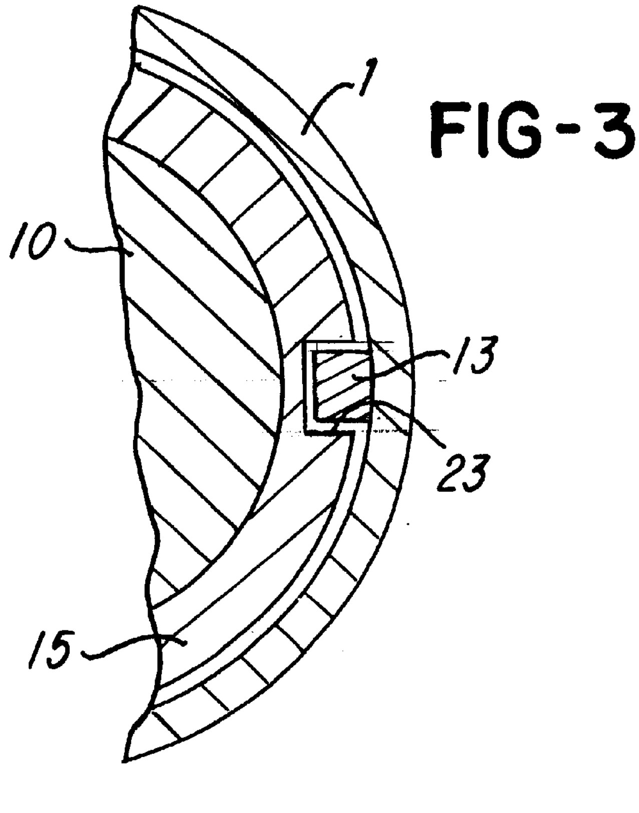
FIG-3

METHOD AND APPARATUS FOR LOAD COMPENSATING DOORS AND HATCHES

BACKGROUND OF THE INVENTION

The present invention relates generally to mechanisms used for load compensating a door or hatch, and more particularly to a method and an apparatus for load compensating doors and hatches, including trunks and tailgates of automobiles.

Most of today's cars, trucks, vans, sport utility vehicles, etc., have doors or hatches such as trunks, hatchbacks, tailgates, or the like. These doors or hatches are very convenient in that accessibility to the inside of the vehicle is greatly enhanced. These doors and hatches are often quite large, therefore, they are often quite heavy.

To accommodate for the weight of the door or hatch, auto makers often put some sort of compensating device on the door or hatch to make the opening or lifting of it easier. Such compensating devices are known to include gas or mechanical springs and hydraulic struts.

Generally, a gas spring is a cylinder, sealed on both ends, which contains a shaft connected to a piston within the cylinder and extending out one end of the cylinder. Nitrogen, or an equivalent gas, is placed in the cylinder. The pressure created by the nitrogen applies force to the piston and causes the shaft to be extended. The amount of nitrogen placed in the cylinder can be varied to compensate for the weight of the door or hatch that is being supported. However, when a person closes the door or hatch, the force exerted on the piston by the nitrogen must be overcome in order to force the shaft back into the cylinder. Hence, the gas cylinder aids the opening of the door by load compensating the weight of the door or hatch during opening, but hinders the closing of the door or hatch by requiring more force to close it.

Similar to gas springs, hydraulic struts are comprised of a cylinder with a shaft attached to a piston. However, hydraulic struts utilize pressurized water, or similar liquid, to provide the force necessary for load compensating the weight of the door or hatch.

Additionally, hydraulic struts can be adapted to remove the excessive closing forces associated with gas springs. To accomplish this, the hydraulic strut is fitted with a mechanism providing override capability. Such an override mechanism puts a back pressure on the hydraulic system. This allows the door or hatch to be closed easily without the requirement of overcoming the load compensating forces of the hydraulic strut.

However, hydraulic struts are complicated systems. They are expensive to build and require power sources, such as special fluid pumps or the like, which are not typically present on the vehicle. In addition, adding override capability to a hydraulic strut is difficult to do, for a control must be used to sense when the door or hatch is being closed and thus applying a back pressure.

What is needed therefore is a method and an apparatus for load compensating doors or hatches for: (1) assisting in the opening of the door or hatch, (2) counterbalancing the door or hatch to keep it open, (3) easily overriding the load compensation forces for closing the door or hatch, and (4) utilizing a power source already present on a typical vehicle.

SUMMARY OF THE INVENTION

In accordance with one embodiment of the present invention, there is provided an apparatus for moving a vehicle door relative to a vehicle frame. The apparatus includes a first threaded member which is mechanically linked to the vehicle frame. The apparatus further includes a second threaded member which is mechanically linked to the vehicle door, wherein the second threaded member cooperates with the first threaded member so that the second threaded member is moved linearly relative to the first threaded member when either the first threaded member or the second threaded member is rotated.

Pursuant to another embodiment of the present invention, there is provided an apparatus for moving a vehicle door relative to a vehicle frame. The apparatus includes a motor for rotating a shaft. The apparatus further includes a first threaded member coupled to the shaft of the motor, wherein the first threaded member is mechanically linked to the vehicle frame. Moreover, the apparatus includes a second threaded member which cooperates with the first threaded member so that the second threaded member is moved linearly relative to the first threaded member when the first threaded member is rotated by the shaft of the motor, wherein the second threaded member is mechanically linked to the vehicle door.

According to yet another embodiment of the present invention, there is provided an apparatus for moving a vehicle door relative to a vehicle frame. The apparatus includes a motor for rotating a shaft. The apparatus further includes a first threaded member coupled to the shaft of the motor, wherein the first threaded member is mechanically linked to the vehicle door. In addition, the apparatus includes a second threaded member which cooperates with the first threaded member so that the second threaded member is moved linearly relative to the first threaded member when the first threaded member is rotated by the shaft of the motor, wherein the second threaded member is mechanically linked to the vehicle frame.

Pursuant to still another embodiment of the present invention, there is provided a method of moving a vehicle door relative to a vehicle frame, with the vehicle frame being connected to a first threaded member and the vehicle door being connected to a second threaded member. The method includes the steps of (1) engaging the first threaded member with the second threaded member so that the second threaded member moves linearly relative to the first threaded member when either the first threaded member or the second threaded member is rotated, and (2) rotating either the first threaded member or the second threaded member so as to cause the vehicle door to be moved relative to the vehicle frame.

It is therefore an object of the present invention to provide a new and useful method and apparatus for moving a vehicle door relative to a vehicle frame.

It is another object of the present invention to provide an improved method and apparatus for moving a vehicle door relative to a vehicle frame.

It is yet another object of the present invention to provide a method and apparatus for moving a vehicle door relative to a vehicle frame which is powered by an energy source such as a D.C. voltage source which is readily available in a conventional vehicle.

It is still another object of the present invention to provide a method and apparatus for moving a vehicle door relative to a vehicle frame which requires a relatively small amount of effort to close the vehicle door onto the vehicle frame.

It is still another object of the present invention to provide a method and apparatus for moving a vehicle door relative to a vehicle frame which is less complex relative to other load compensating devices.

The above and other objects, features, and advantages of the present invention will become apparent from the following description and the attached drawings.

BRIEF DESCRIPTION OF THE DRAWINGS

FIG. 1 is a perspective view of a vehicle having an apparatus for moving a vehicle door relative to a vehicle frame which incorporates the features of a first embodiment of the present invention therein;

FIG. 3 is a fragmentary view of the apparatus taken generally along the line 3—3 of FIG. 2 as viewed in the direction of the arrows;

DETAILED DESCRIPTION OF THE INVENTION

Figure 2:
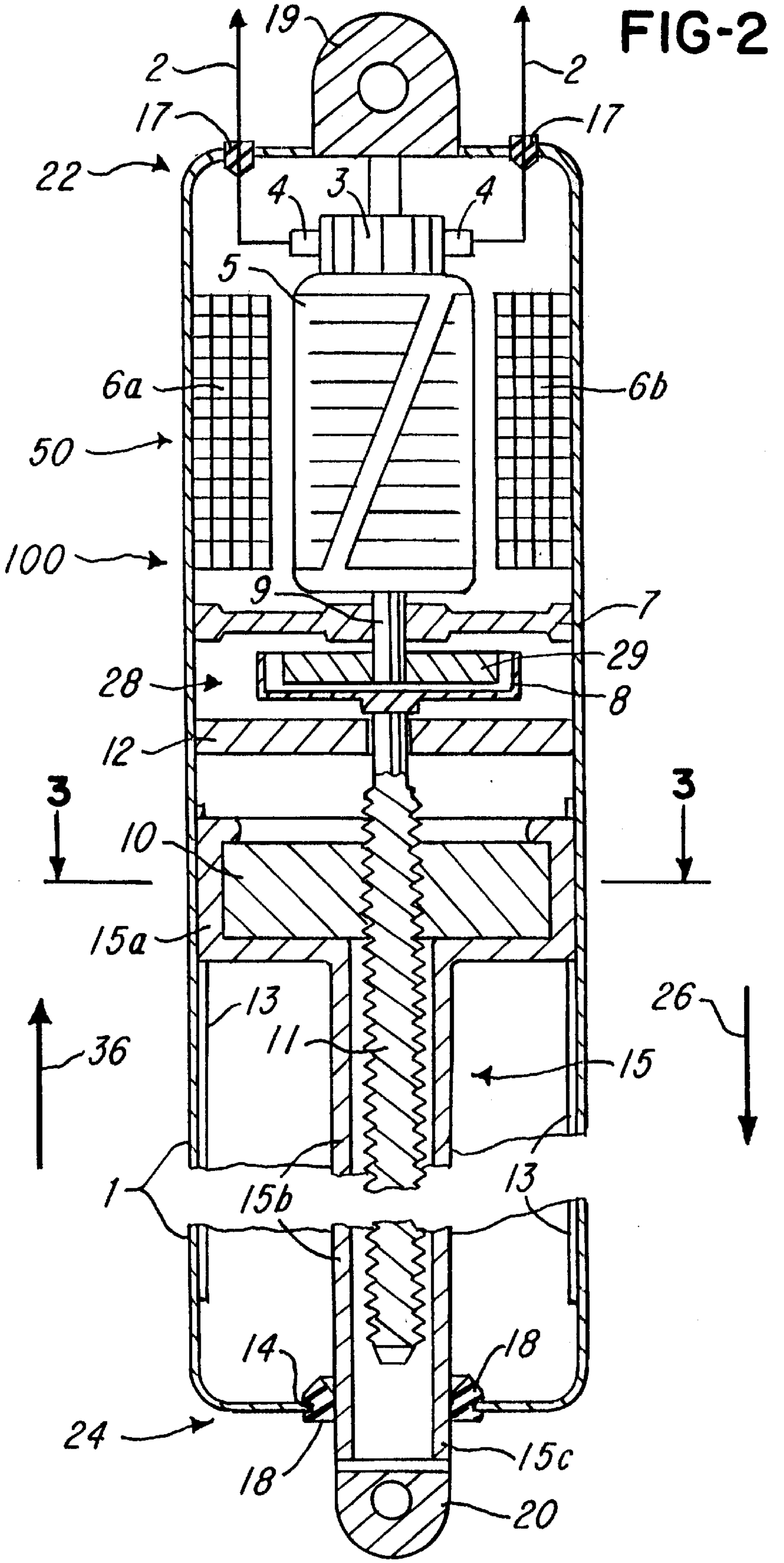
FIG. 2 is an enlarged cross sectional view of the apparatus for moving a vehicle door relative to a vehicle frame of FIG. 1.

While the invention is susceptible to various modifications and alternative forms, a specific embodiment thereof has been demonstrated by way of example in the drawings and will be described in detail herein. It should be understood that there is no intention to limit the invention to the particular form disclosed, but on the contrary, the intention is to cover all modifications, equivalents, and alternatives falling within the spirit and scope of the invention as defined by the appended claims.

Referring to FIG. 1, there is shown a perspective view of a portion of a vehicle A. The vehicle A includes a power actuated load compensation device 100 on opposite sides of the vehicle A. A first end 22 of the power actuated load compensation device 100 is affixed to a vehicle frame C. Moreover, a second end 24 of the power actuated load device 100 is affixed to a door B. As used herein, the term "door" is a hinged door, a sliding door, a trunk lid, a hatchback lid, a tailgate lid, or any other movable closure device on the vehicle.

Referring to FIG. 2, there is shown a first embodiment of a power actuated load compensation device 100 which incorporates the features of the present invention therein.

A first end 22 of a closed cylinder 1, includes a motor 50. The motor 50 includes a commutator 3 which is contacted by brushes 4. A D.C. voltage is supplied to the brushes 4, via motor leads 2. The motor leads 2 are connected, through seals 17, to a control system (not shown), or the like, which contains a power supply. The D.C. voltage from the brushes 4 is transferred to an armature 5 via the commutator 3. The armature 5 utilizes the D.C. voltage to create a magnetic field. This magnetic field interacts with the magnetic fields of magnets 6*a*–6*b*. The magnet 6*a* represents the north pole of a magnet, whereas the magnet 6*b* represents the south pole of a magnet. The interaction between the magnetic fields sets a motor shaft 9 into motion. The commutator 3 reverses the flow of current at regular intervals in order to reverse the magnetic field of the armature 5 and thus keeping the motor shaft 9 turning. Collectively, the motor leads 2, the commutator 3, the brushes 4, the armature 5, the magnets 6*a*–6*b*, and the motor shaft 9 comprise the motor 50. The embodiment in FIG. 2 utilizes a D.C. motor 50, however, those skilled in the art will realize that any type of motor would suffice, including a universal motor for both D.C. and A.C. voltages.

A radial bearing 7 counteracts the radial forces transmitted to motor shaft 9 and thus holds the motor shaft 9 central to the closed cylinder 1.

A rotor mechanism 29 is disposed on a first end 28 of the motor shaft 9 and interacts with a clutch assembly 8. When the rotor mechanism 29, reaches a predetermined acceleration, the clutch assembly 8 engages the rotor mechanism 29, which in turn rotates a screw 11 which is connected to the clutch assembly 8.

The screw 11 is externally threaded in order to threadingly engage the nut 10 which is internally threaded. The nut 10 is attached to a shaft 15 at the shaft portion 15*a*. For example, the nut 10 could be either welded, screwed, or similarly fastened to shaft 15 by other suitable means. As the screw 11 rotates, it is threaded through the nut 10 and into the shaft portion 15*b*.

As the screw 11 is threaded through the nut 10, the nut 10 is forced in a direction as indicated by arrow 26 toward a second end 24 of the closed cylinder 1. The shaft 15, being attached to nut 10, is likewise forced towards the second end 24 of closed cylinder 1, through seals 18.

The closed cylinder 1 includes guide members 13 which are secured to an internal wall thereof. The guide members 13 may be integrally formed with the cylinder 1. The shaft 15 includes channels 23 (FIG. 3) which receive the guide members 13 therein so as to prevent the shaft 15 from rotating. Hence, the nut 10 likewise does not rotate, but moves only in the linear direction indicated by arrow 26 and the linear direction indicated by the arrow 36. FIG. 3 shows the cooperative relationship between the guide members 13 and the channels 23.

Radial and thrust bearing 12 compensates for the axial forces created by the movement of nut 10. Additionally, radial and thrust bearing 12 counteracts the radial forces created by the screw 11 as it rotates, and therefore keeps the screw 11 central to the closed cylinder 1.

Figure 4:
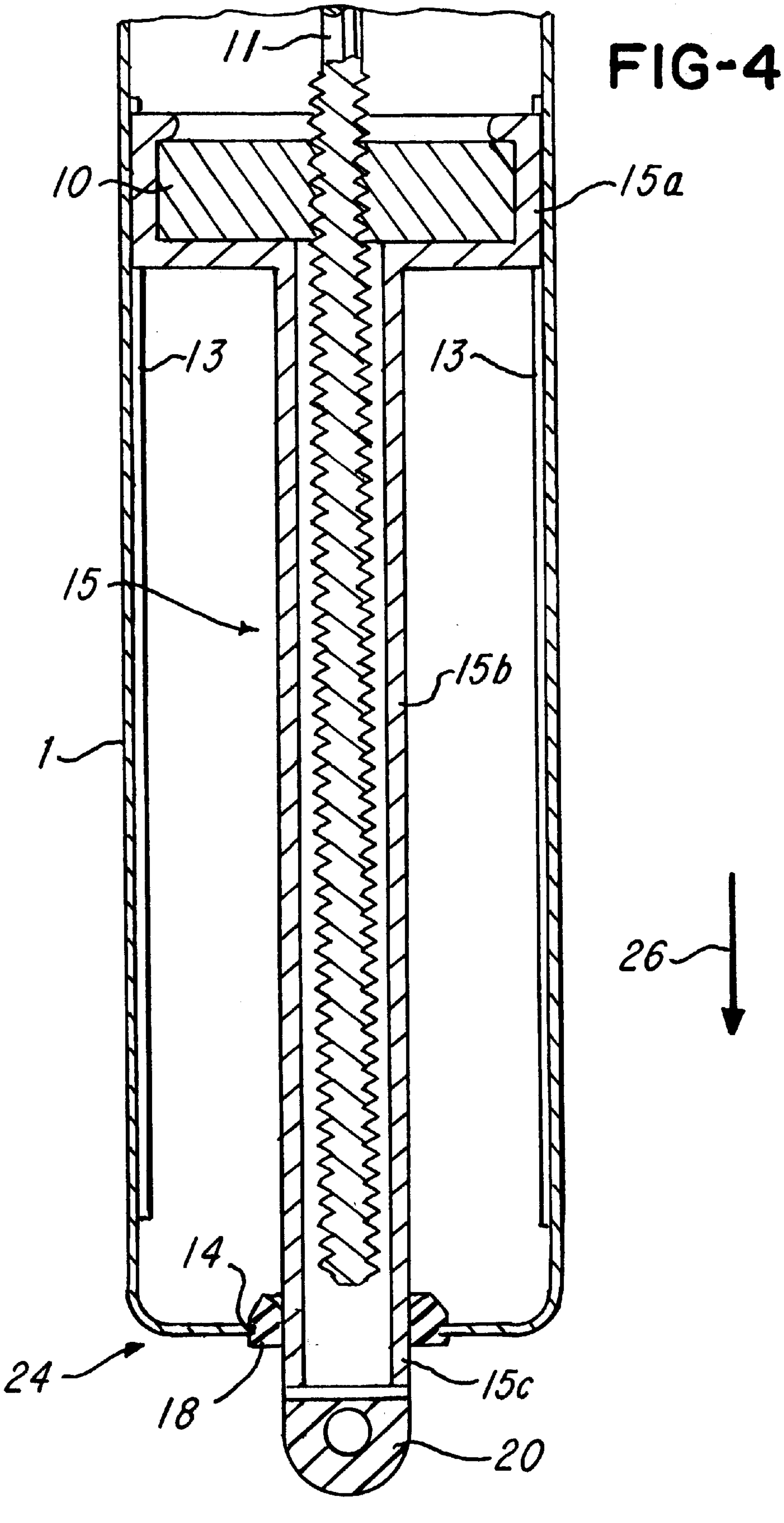
FIG. 4 is a fragmentary cross-sectional view of the apparatus for moving a vehicle door relative to a vehicle frame of FIG. 1, with the nut and the shaft shown located at a first position.
Figure 5:
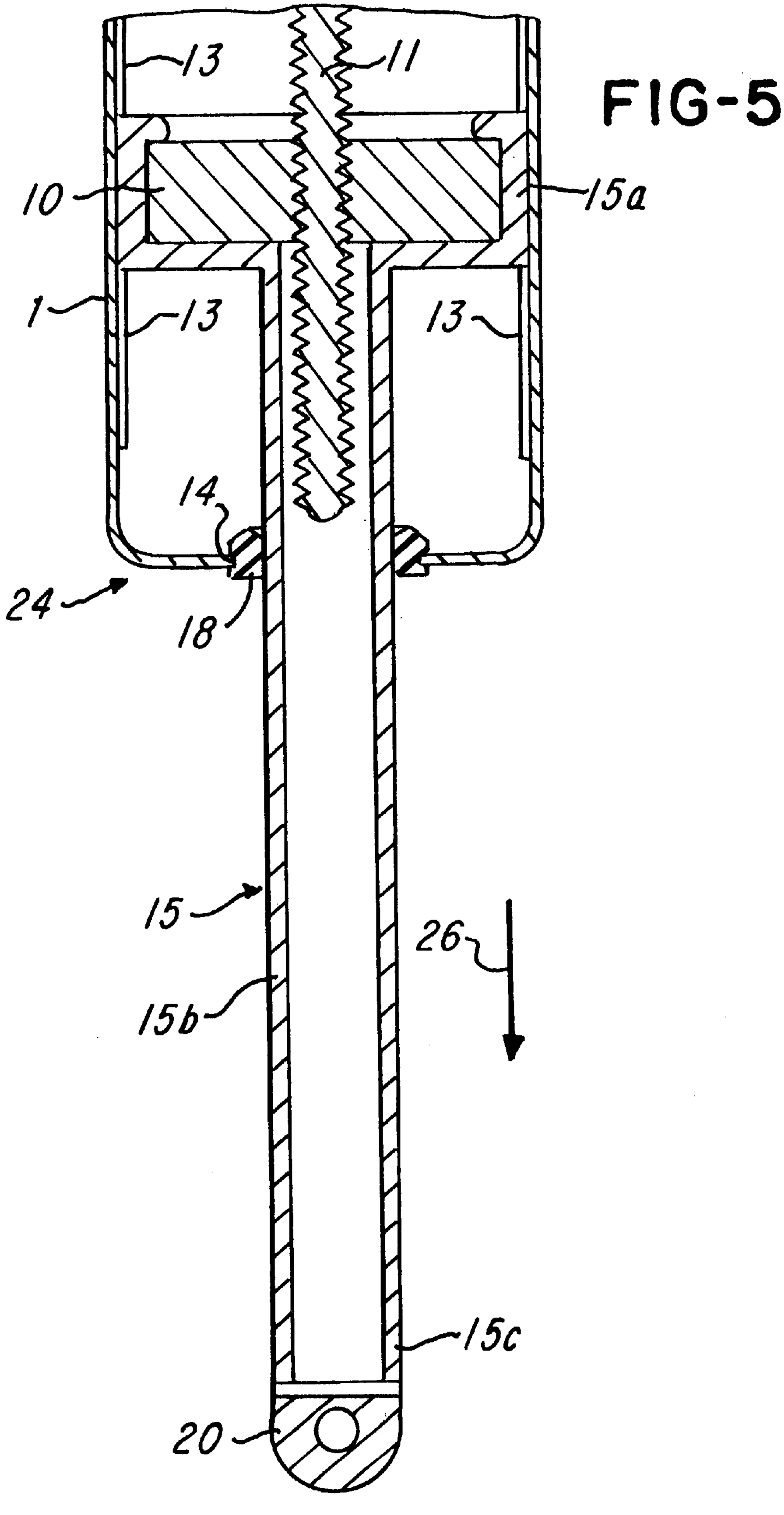
FIG. 5 is a fragmentary cross-sectional view of the apparatus similar to FIG. 4, but showing the nut and the shaft located at a second position.

The second end 24 of the closed cylinder 1 includes the opening 14. The shaft 15 protrudes through the opening 14 through seals 18. FIG. 4 shows the shaft 15 in a first position, whereas FIG. 5 shows the shaft 15 in a second position. As the nut 10 continues to exert force upon the shaft 15, the shaft 15 moves from the first position of FIG. 4 to the second position of FIG. 5.

A shaft portion 15*c* includes a mount 20. A mount 19 is disposed on the first end 22 of the closed cylinder 1. The mount 19 is affixed to the vehicle frame while the mount 20 is affixed to the vehicle door (FIG. 1). Therefore, as the shaft 15 is forced out of the closed cylinder 1, the mount 20 is pushed in a direction opposite to the mount 19 and therefore assists in opening the door or hatch. Alternatively, the mount 19 may be affixed to the door or hatch of the vehicle and the mount 20 attached to the frame of the vehicle.

As discussed above, the power actuated load compensation device 100 assists in opening a hatch or door. However, it is not desirable to require large amounts of force to close the hatch or door. Depending on the size of the motor 50 used, the linear force in a direction indicated by the arrow 26, generated by the motor 50, can make it difficult to move the screw 11 in the direction indicated by arrow 36 through the nut 10. In such a case, it is advantageous to decouple the motor from the screw 11. Hence, if the acceleration of the rotor mechanism 29 is less than a predetermined level, the clutch assembly disengages the rotor mechanism 29. Therefore, the motor shaft 9 is decoupled from the screw 11. This efficiently allows the screw 11 to move in the direction indicated by arrow 36 through the nut 10, and therefore, move the shaft 15 back into the closed cylinder 1 without requiring a substantial amount of force to overcome the linear force in the direction indicated by the arrow 26 generated by the motor 50. Hence, only the friction created by the interface of screw 11 and nut 10 needs to be overcome to close the door or hatch.

Figure 6:
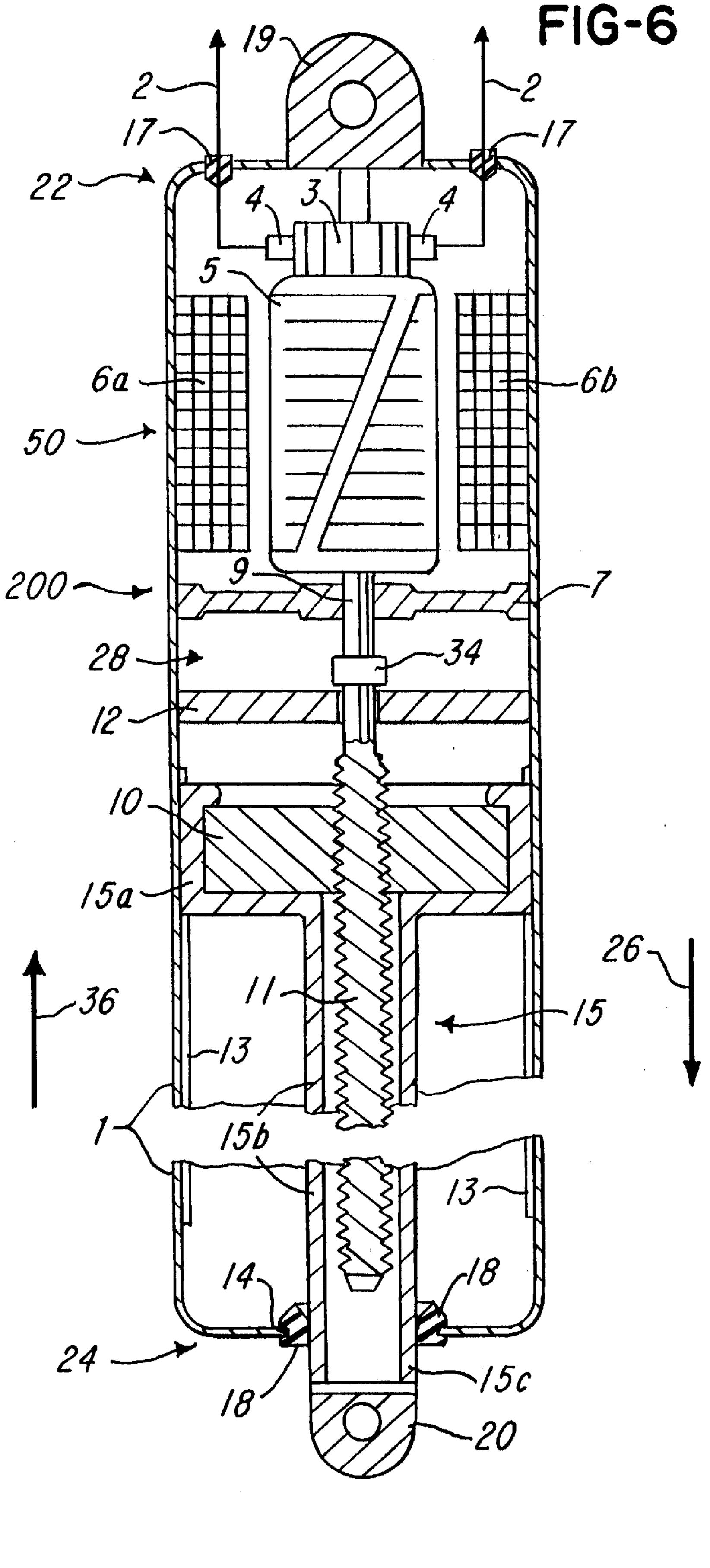
FIG. 6 is an enlarged cross-sectional view of a second embodiment of the apparatus for moving a vehicle door relative to a vehicle frame which incorporates the features of the present invention therein.

Referring now to FIG. 6, there is shown a second embodiment of a power actuated load compensation device 200 which incorporates the features of the present invention therein. The power actuated load compensation device 200 includes all of the elements of power actuated load compensation device 100, with the exception of the clutch 8 and the rotor mechanism 29. Instead, the compensation device 200 includes a coupling 34 for directly coupling the motor shaft 9 to the screw 11. Alternatively, the motor shaft 9 could be made longer and a portion of the motor shaft 9 could be externally threaded so as to define the screw 11, thus eliminating the need for a separate screw 11.

This embodiment has the advantage of a simpler design by using fewer components, a lower cost to manufacture, and can be used if an override mechanism is not needed for the power actuated load compensation device.

Figure 7:
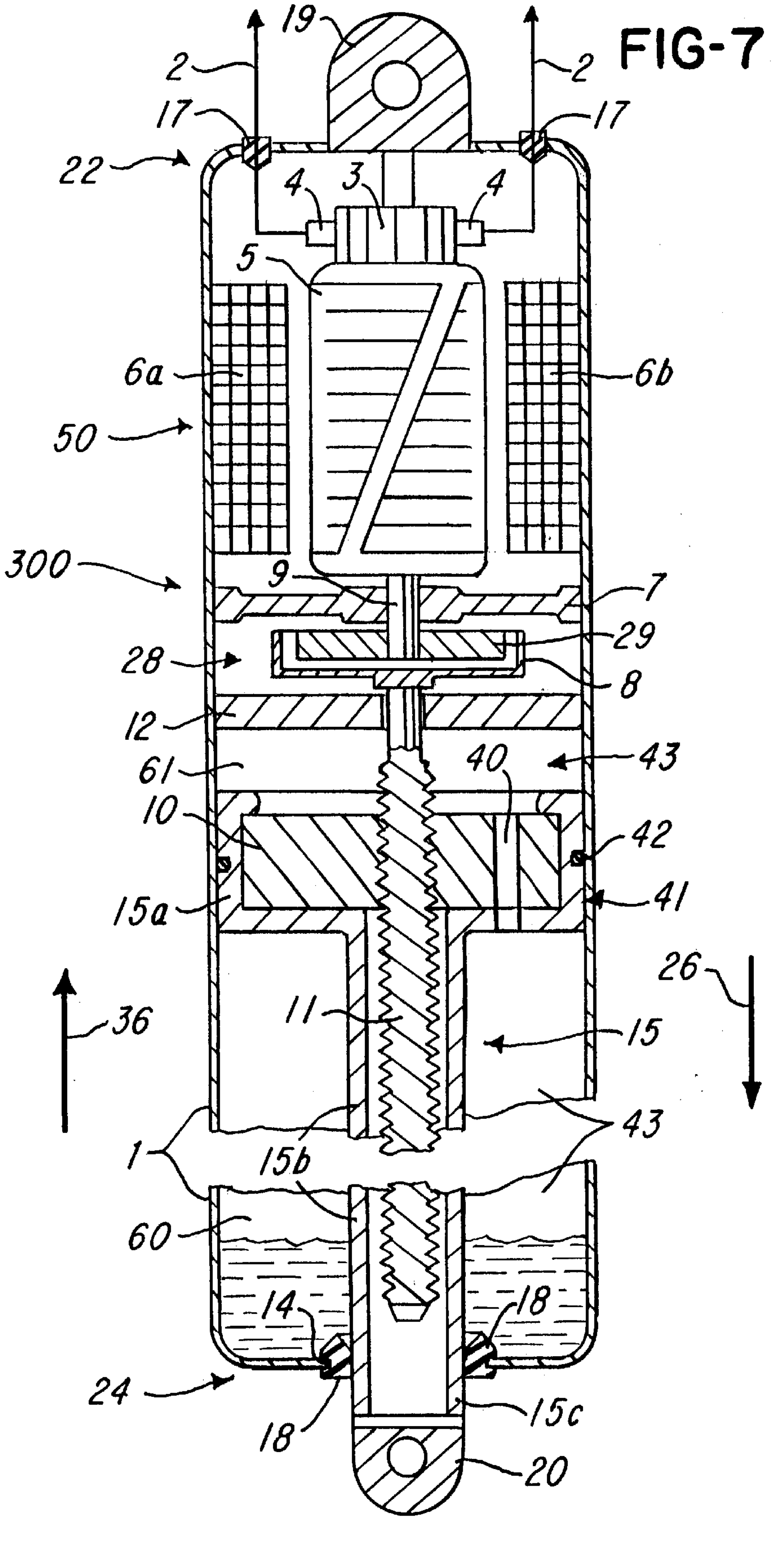
FIG. 7 is an enlarged cross-sectional view of a third embodiment of the apparatus for moving a vehicle door relative to a vehicle frame which incorporates the features of the present invention therein.

Referring now to FIG. 7, there is shown a third embodiment of a power actuated load compensation device 300 which incorporates the features of the present invention therein. The power actuated load compensation device 300 includes all of the elements of power actuated load compensation device 100. However, the compensation device 300 further includes an orifice 40, a piston 41, a piston seal 42, and a gas area 43. Although not shown, the anti-rotational function of guide members 13 and channels 23 may be accomplished in other ways. In this regard, cylinder 1 could be designed such that it defines a non-cylindrical shape, such as a closed oblong, ellipse, any polygonal shape (e.g. triangular or rectangular), or any other shape suitable for preventing rotation. A complementary-shaped piston 41 having a suitable piston seal 42, such as an O-ring or an O-ring-like, may then be placed in the cylinder 1.

In some vehicle applications, it may not be possible to completely counterbalance the weight of the door or hatch without continually operating the motor 50 due to the weight of the door or hatch. Hence, when the shaft 15 is fully extended, the weight of the door or hatch may cause the door or hatch to close abruptly unless the motor 50 continues to operate to provide the necessary force in the direction indicated by the arrow 26 so as to hold the door or hatch open.

To prevent this from occurring, it may be desirable to provide a fluid material in the fluid area 43. One fluid which may be used is a gas such as nitrogen. Collectively working with the piston 41, the fluid can provide a counterbalancing force to aid in both the opening of the door or hatch and the maintaining of the door or hatch in the open position as shown in FIG. 1. This counterbalancing is achieved using the pressure and volume principles at work upon the fluid in fluid area 43. As the piston 41 is moved in the direction indicated by arrow 26, the fluid is forced through orifice 40 in the direction indicated by arrow 36. When the piston reaches full extension, as shown in FIG. 5, it is no longer being driven by the motor 50. At this point, the piston 41 will naturally tend to move in the direction indicated by arrow 26 and return to the closed position, as shown in FIG. 4. This tendency is opposed by the dampening effect created as the return of the fluid to area 60 is resisted by the flow of the fluid from a high pressure area 60 to a low pressure area 43 (FIG. 7) through orifice 40.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

For example, to aid in the function of holding the door or hatch open, an additional clutch mechanism could be added to either the screw 11 or the shaft 15. This clutch assembly could engage and lock the screw 11 or the shaft 15 in place when the door or hatch is fully opened. Moreover, when the door or hatch is desired to be moved to its closed position, the clutch could be disengaged and the screw 11 would be allowed to back drive through the nut 10, and therefore, pull the shaft back into closed cylinder 1.

It should be understood that other suitable means for facilitating driving screw 11 may be provided. For example, gear and clutch features shown in U.S. Pat. No. 5,582,279, which issued to the same assignee as the present invention and which is incorporated herein by reference and made a part thereof, may be used. Additionally, it should be appreciated that a different type of screw and nut combination could be used in place of the screw 11 and the nut 10. For example, screw 11 could be a ball screw and nut 10 could be a ball nut.

Further, the motor 50 is a D.C. motor. This type of motor was selected due to its use of D.C. voltages, which are generally present in most vehicles. However, any motor type, powered by any power source, could be used if it provided the force needed to drive the screw 11.

A variation in the type and number of bearings included is possible, as long as the motor shaft 9 and the screw 11 are held centrally to the closed cylinder 1. For example, if the power actuated load compensation device 200 utilizes a single member functioning as both the motor shaft 9 and the screw 11, then the radial bearing 7 could possibly be deleted, relying on the radial and thrust bearing 12 to function as the sole bearing for the system.

What is claimed is:

1. An apparatus for moving a vehicle door relative to a vehicle frame, comprising:

a cylinder;

a motor situated in said cylinder for rotating a shaft;

a first threaded member coupled to the shaft of said motor, wherein said first threaded member is mechanically linked to the vehicle;

a second threaded member which cooperates with said first threaded member so that said second threaded member does not rotate but moves linearly relative to said first threaded member when said first threaded member is rotated by the shaft of said motor, wherein said second threaded member is mechanically linked to the vehicle door; and a piston associated with said second threaded member and coupled to a vehicle component; and said piston being situated in said cylinder and defining a first pressure area and a second pressure area on each side of said piston;

said first threaded member cooperating with said second threaded member when said motor is energized to drive said piston in a first direction to move said vehicle component to an open position and increasing pressure in said first pressure area to provide a counterbalancing pressure to assist movement of said piston in a second direction opposite said first direction when a user moves said vehicle component to a closed position.

2. The apparatus of claim 1, further comprising a clutch which selectively couples the shaft of said motor to said first threaded member.

3. The apparatus of claim 1, further comprising a cylinder having an opening defined at a first end thereof, wherein a portion of said second threaded member extends out of said opening.

4. The apparatus of claim 3, wherein:

said piston includes a piston end portion and a connection end portion, said piston end portion of said second threaded member is positioned within said cylinder, and said connection end portion of said second threaded member extends out of said opening.

5. The apparatus of claim 4, further comprising a quantity of fluid located within said first pressure area, said first pressure area being between said piston end portion of said second threaded member and said first end of said cylinder.

6. The apparatus of claim 4, further comprising a seal interposed between said opening and said connection end portion of said second threaded member.

7. The apparatus of claim 3, wherein:

said cylinder includes a guide member positioned on an internal wall thereof, and said piston includes a channel defined in an outer wall thereof which receives the guide member therein.

8. The apparatus of claim 1, wherein the door is chosen from a group consisting of a hinged door, a sliding door, a trunk lid, a hatchback, a tailgate, and a door attached to the vehicle.

9. The apparatus of claim 1, wherein:

said first threaded member includes a screw, and said second threaded member includes a nut.

10. An apparatus for moving a vehicle door relative to a vehicle frame, comprising:

a cylinder;

a motor situated in said cylinder for rotating a shaft;

a first threaded member coupled to the shaft of said motor, wherein said first threaded member is mechanically linked to the vehicle;

a second threaded member which cooperates with said first threaded member so that said second threaded member does not rotate but moves linearly relative to said first threaded member when said first threaded member is rotated by the shaft of said motor, wherein said second threaded member is mechanically linked to the vehicle frame; and a piston associated with said second threaded member and coupled to a vehicle component; and said piston being situated in said cylinder and defining a first pressure area and a second pressure area on each side of said piston;

when said motor is energized, said first threaded member cooperates with said second threaded member to drive said piston in a first direction to move said vehicle component to an open position and increasing pressure in said first pressure area and providing a pressure which assists movement of said piston in a second direction opposite said first direction to assist a user when moving said vehicle component to a closed position.

11. The apparatus of claim 10, further comprising a clutch which selectively couples the shaft of the motor to said first threaded member.

12. The apparatus of claim 10, further comprising a cylinder having an opening defined at a first end thereof, wherein a portion of said second threaded member extends out of said opening.

13. The apparatus of claim 12, wherein:

said second threaded member includes a piston end portion and a connection end portion, said piston end portion of said second threaded member is positioned within said cylinder, and said connection end portion of said second threaded member extends out of said opening.

14. The apparatus of claim 13, further comprising a quantity of compressed fluid located within said cylinder between said piston end portion of said second threaded member and said first end of said cylinder.

15. The apparatus of claim 13, further comprising a seal interposed between said opening and said connection end portion of said second threaded member.

16. The apparatus of claim 12, wherein:

said cylinder includes a guide member positioned on an internal wall thereof, and said second threaded member includes a channel defined in an outer wall thereof which receives the guide member therein.

17. The apparatus of claim 10, wherein the door is chosen from a group consisting of a hinged door, a sliding door, a trunk lid, a hatchback, a tailgate, and a door attached to the vehicle.

18. The apparatus of claim 10, wherein:

said first threaded member includes a screw, and said second threaded member includes a nut.

19. A method of moving a vehicle door relative to a vehicle frame, with the vehicle frame being connected to a first threaded member and the vehicle door being connected to a second threaded member, comprising the steps of:

providing said second threaded member with a piston;

situating said first and second threaded members in a cylinder; said piston defining a first pressure area and a second pressure area;

providing a motor for rotatable driving the first threaded member so that the second threaded member drives said piston to move said vehicle door between an open position and a closed position; and said piston pressurizing fluid in said first pressure area such that a pressure assist is provided when a user moves the vehicle door to a closed position.

20. The method of claim 19, wherein the rotating step includes the step of coupling an output shaft of a motor to either the first threaded member or the second threaded member.

21. The method of claim 20, wherein the rotating step further includes the steps of:

coupling the output shaft of the motor to either the first threaded member or the second threaded member during a first time period, and decoupling the output shaft of the motor to either the first threaded member or the second threaded member during a second time period.

22. The method of claim 21, wherein:

the vehicle door is being raised away from the vehicle frame during the first time period, and the vehicle door is being lowered upon the vehicle frame during the second time period.

23. The apparatus of claim 18, wherein:

said screw is a ball screw and said nut is a ball nut.

24. The apparatus of claim 3, wherein said piston comprises an aperture coupling said first pressure area to said second pressure area.

25. The method of claim 19, wherein said piston comprises an aperture coupling said first pressure area to said second pressure area.

* * * * *